United States P

Yamashita et al.

3,870,400

Mar. 11, 1975

[54] WIDE-ANGLE LENS SYSTEM WITH MOVABLE LENS FOR CORRECTING SHORT DISTANCE PHOTOGRAPHIC FACULTY ARRANGED NEAR DIAPHRAGM

[75] Inventors: Nobuo Yamashita; Toru Fujii, both of Tokyo, Japan

[73] Assignee: Olympus Optical Company Limited, Tokyo, Japan

[22] Filed: May 7, 1973

[21] Appl. No.: 358,122

[30] Foreign Application Priority Data
May 10, 1972   Japan................................ 47-46085

[52] U.S. Cl................... 350/214, 350/176, 350/255
[51] Int. Cl. ............................................... G02b 9/64
[58] Field of Search..................... 350/214, 215, 216

[56] References Cited
UNITED STATES PATENTS

| | | | |
|---|---|---|---|
| 2,537,912 | 1/1951 | Reiss.................................... | 350/186 |
| 3,748,021 | 7/1973 | Tajima et al......................... | 350/214 |
| 3,748,022 | 7/1973 | Tajima................................. | 350/214 |

*Primary Examiner*—John K. Corbin

[57] ABSTRACT

A wide-angle lens system with a movable lens for correcting the short distance photographic faculty arranged near a diaphragm, which comprises a front lens group F and a rear lens group R separated by a diaphragm space, said rear group R comprising a movable lens in the form of a positive or negative singlet or a lens having a simple construction, said movable lens being arranged near the diaphragm and adapted to be moved in response to the change of its distance from an object toward the diaphragm when it is the positive lens and away from the diaphragm when it is the negative lens, and defined by the condition $$0.6 < |f_m/f| < 3.5$$

where $f_m$ is the focal length of said movable lens and $f$ is the overall focal length of the total lens system.

4 Claims, 20 Drawing Figures

FIG_1
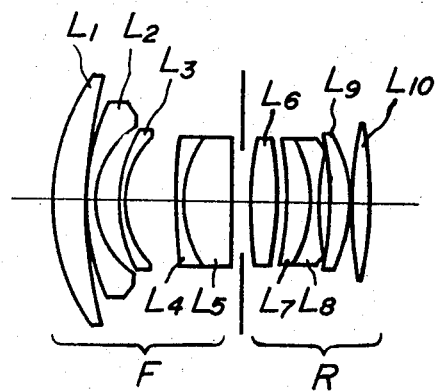
FIG_2
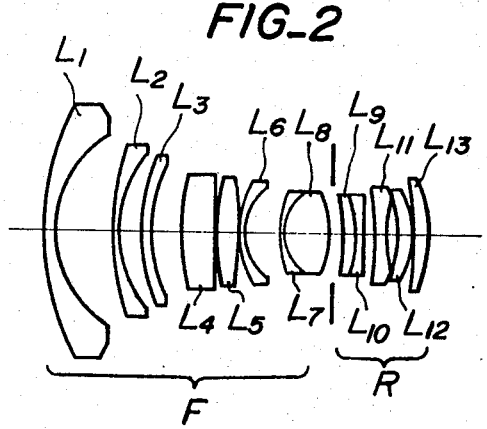

FIG_3a
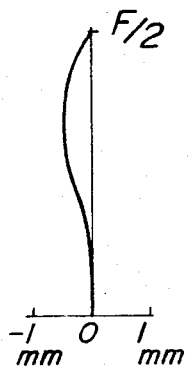
FIG_3b
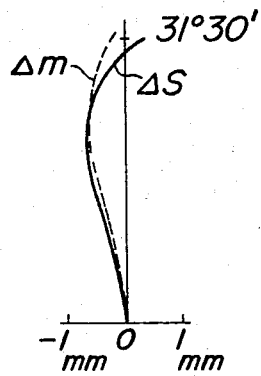
FIG_3c
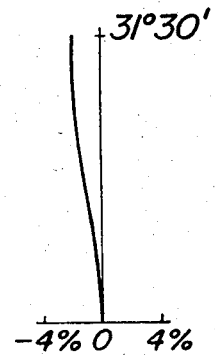
FIG_4a
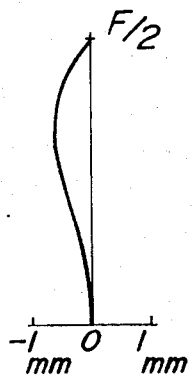
FIG_4b
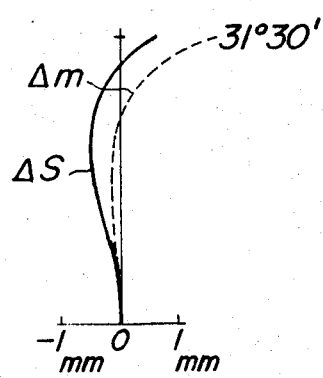
FIG_4c
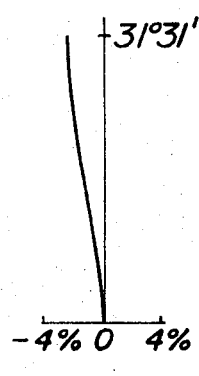

FIG_5a
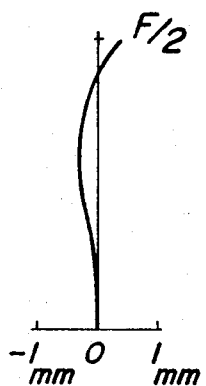
FIG_5b
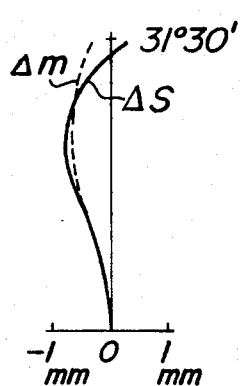
FIG_5c
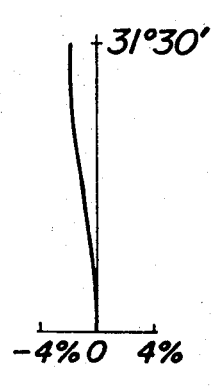
FIG_6a
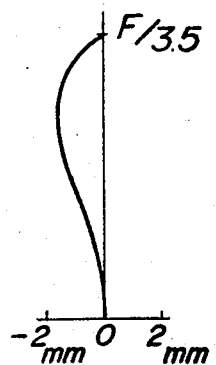
FIG_6b
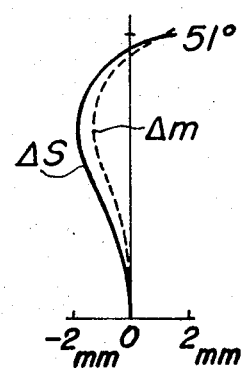
FIG_6c
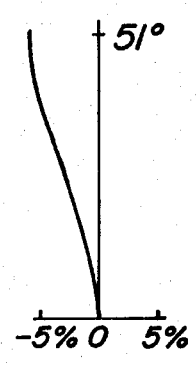

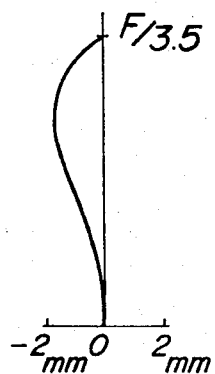 FIG_7a
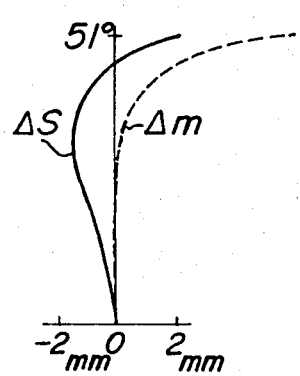 FIG_7b
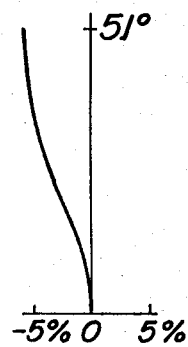 FIG_7c
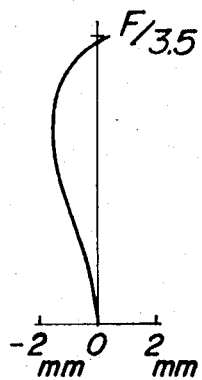 FIG_8a
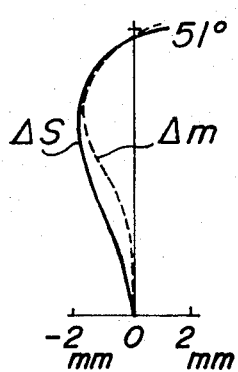 FIG_8b
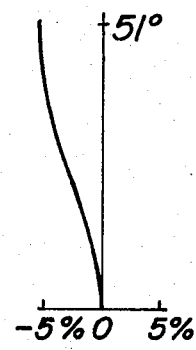 FIG_8c

WIDE-ANGLE LENS SYSTEM WITH MOVABLE LENS FOR CORRECTING SHORT DISTANCE PHOTOGRAPHIC FACULTY ARRANGED NEAR DIAPHRAGM

This invention relates to a wide-angle lens system with a movable lens for correcting the short distance photographic faculty arranged near a diaphragm.

A wide-angle lens for use in single-lens reflex cameras is particularly required to be long in its back focal length. As a result, so-called retrofocus type lens is used for the wide-angle lens. In such kind of lenses, it is possible to improve their infinitely long distance photographic faculty. In general, however, the short distance photographic faculty becomes considerably degraded. That is, in general, the photographic objective lens system considerably varies its spherical aberration when an object point is shortly distant away from the lens system. In this kind of wide-angle lens, its short focal length causes the spherical aberration on axis to more or less be changed such that the correction thereof becomes insufficient. In addition, the proportion of the change in the image surface curvature out of axis is large relative to the change in the spherical aberration on axis. As a result, the photographic faculty at the periphery of the picture surface becomes degraded. This is considered to be due to the fact that the refractive powers of the retrofocus lens are proportioned unsymmetrically with respect to the diaphragm position. In order to prevent such degradation of the short distance photographic faculty, it is possible to correct the image surface curvature when the object point is infinitely distant away from the lens system. But, if the picture surface is very large and the change in the image surface curvature out of axis is also large, the infinitely long distance photographic faculty becomes degraded, and as a result, the use of retrofocus type wide-angle lenses has the disadvantage that it is difficult to provide a lens system having uniform and excellent photographic properties throughout the overall ranges used for the photographic purposes.

The object of the invention, by adopting a relatively simple mechanism, is to provide a wide-angle lens system without having the above mentioned disadvantages of the conventional retrofocus type wide-angle lens system.

A feature of the invention is the provision of a wide-angle lens system with a movable lens for correcting the short distance photographic faculty arranged near a diaphragm, which comprises a front lens group F and a rear lens group R separated by a diaphragm space, said rear group R, comprising a movable lens in the form of a positive or negative singlet or a lens having a simple construction, said movable lens being arranged near the diaphragm and adapted to be moved in response to the change of its distance from an object toward the diaphragm when it is the positive lens and away from the diaphragm when it is the negative lens, and defined by the condition $$0.6 < |f_m/f| < 3.5$$

where $f_m$ is the focal length of said movable lens and $f$ is the overall focal length of the total lens system.

For a better understanding of the invention, the same will be explained by reference to the accompanying drawings, in which:

FIG. 1 shows a cross-section one embodiment of the wide-angle lens system constructed according to the invention;

FIG. 2 shows in cross-section another embodiment of the wide-angle lens system constructed according to the invention;

FIGS. 3a, 3b and 3c show various aberration characteristic curves of the embodiment shown in FIG. 1 when the object point is infinitely distant away from the lens system;

FIGS. 4a, 4b and 4c show various aberration characteristic curves of the embodiment shown in FIG. 1 with 1/40× for short distance photographic purposes when the movable lens is not moved and hence the various aberrations are not corrected;

FIGS. 5a, 5b and 5c show various aberration characteristic curves similar to FIGS. 4a, 4b and 4c, respectively, but when the movable lens is moved and hence the various aberrations are corrected;

FIGS. 6a, 6b and 6c show various aberration characteristic curves of the embodiment shown in FIG. 2 when the object point is infinitely distant away from the lens system;

FIGS. 7a, 7b and 7c show various aberration characteristic curves of the embodiment shown in FIG. 2 with 1/40× for short distance photographic purpose when the movable lens is not moved and hence the various aberrations are not corrected; and FIGS. 8a, 8b and 8c show various aberration characteristic curves similar to FIGS. 7a, 7b and 7c, respectively, but when the movable lens is moved and hence the various aberrations are corrected.

Referring to FIG. 1 showing one embodiment of the wide-angle lens system according to the invention, F designates a front lens group which is contructed by four components and five lenses $L_1$ to $L_5$. R shows a rear lens group separated from the front lens group F by a diaphragm space and constructed as four components and five lenses $L_6$ to $L_{10}$.

In accordance with the invention, the lens $L_6$ in the form of a positive singlet of the rear lens group R is made movable in response to the change of its distance from an object (not shown) toward the diaphragm in order to correct the various aberrations, particularly, the astigmatism and make these aberrations uniform throughout the overall ranges used for the photographic purposes.

In FIG. 2 is shown another embodiment of the wide-angle lens system according to the invention. In the present embodiment, the front lens group F is constructed by seven components and eight lenses $L_1$ to $L_8$ and the rear lens group R separated from the front lens group F by the diaphragm space is constructed by four components and five lenses $L_9$ to $L_{13}$.

In the present embodiment, a negative doublet composed of a meniscus lens $L_9$ that is cemented by its rear surface onto a concave lens $L_{10}$ is made movable in response to the change of its distance from the object away from the diaphragm in order to correct the various aberrations, particularly, the astigmatism and make these aberrations uniform throughout the overall ranges used for the photographic purposes.

In general, a photographic lens system in which the spherical aberration on axis can be corrected when the object is infinitely distant away from the lens system tends to more or less increase the spherical aberration on axis when the object is shortly distant away from the lens system. The retrofocus type lens system comprising a front lens group which is negative as a whole produces a considerably strong positive refractive power at the rear of the movable lens near the diaphragm. As a result, the presence of such movable lens ensures an incidence of the light rays which pass through the lens system substantially parallel. In this case, if the positive lens is moved toward the object side or the negative lens is moved toward the image side, the light rays tend to pass through that portion of the rear lens group which follows the movable lens and has a positive refractive power and a small aperture. Thus, the insufficiently corrected spherical aberration produced at the rear lens group becomes apparently small, and as a result, the lens system as a whole is capable of correcting the tendency of becoming insufficient in correction when the object is shortly distant away from the lens system.

The provision of the above mentioned movable lens near the diaphragm enables not only the various aberrations caused by the principal light rays, such as distortion, chromatic aberration due to magnification not to be varied when the object is shortly distant away from the lens system from those values which are obtained when the object is infinitely distant away from the lens system, but also unsymmetry of coma not to be occured. The provision of the above mentioned movable lens enables only the astigmatism to be shifted toward the insufficiently corrected direction, and hence it is possible to remarkably improve the image forming faculty at the periphery of the picture surface when the object is shortly distant away from the lens system. This is clearly shown by various aberration characteristic curves of the lens systems to be described later with reference to examples 1 and 2.

As above described, the method of improving the short distance photographic faculty by moving the lens having a simple construction such as a singlet or doublet is not required to change the air spaces between the components of the total lens system and hence is simple mechanism and significantly reliable in operation.

The provision of such movable lens can avoid a relative displacement of the front and rear lens groups F and R, which determine the amount of light rays at the periphery of the wide-angle lens with respect to the diaphragm, and as a result, even if the correction is made when the object is shortly distant away from the lens system, the amount of light rays at the periphery of the wide-angle lens is not changed at all. This is the important advantage for the wide-angle lens which is intended to be insufficient in its amount of light rays at the periphery thereof.

If the refractive power of the movable lens is considerably small if compared with the overall focal length $f$ of the total lens system, the change of aberrations due to the erroneous displacement of the movable lens becomes excessively large. Thus, it is difficult to correct the aberrations in a stable state, and as a result, it is necessary to satisfy the condition $$|f_m| > 0.6f$$

where $f_m$ is the focal length of the movable lens. Conversely, if the focal length $f_m$ of the movable lens becomes longer than $3.5f$, the correcting effect to be obtained by moving the movable lens becomes small. Under such condition, if it is desired to make the correcting effect sufficiently large, the movable lens must be moved for a long distance and as a result, the desired object could not be attained. Thus, the condition $|f_m| < 3.5f$ must be satisfied.

In the retrofocus lens, in general, the refractive power is proportioned such that the incident light rays traverse in parallel the movablle lens near the diaphragm. If the light rays incident upon the movable lens become considerably out of parallel, the spherical aberration is excessively shifted in the positive direction and flare occurs at the center portion of the picture surface when the object is shortly distant away from the lens system. It is preferable, therefore, to satisfy the condition $$|f_{FB}| > 1.0|f_F|$$

where $f_F$ is the focal length of the front lens group F followed by the movable lens and $f_{FB}$ is the back focal length of the front lens group F followed by the movable lens. Thus, it is preferable to divide the lens system or arrange suitable air spaces beforehand such that the above mentioned condition can be satisfied.

The invention will now be described with reference to the following examples.

EXAMPLE 1

$f = 100, 2\omega = 63°$

| Lens | Radii | Thicknesses and Air spaces | n |
|---|---|---|---|
| $L_1$ | $r_1 = 109.757$ | $d_1 = 21.43$ | $n_1 = 1.67$ |
|  | $r_2 = 369.292$ | $d_2 = 0.54$ |  |
| $L_2$ | $r_3 = 205.119$ | $d_3 = 5.65$ | $n_2 = 1.64$ |
|  | $r_4 = 50.850$ | $d_4 = 13.21$ |  |
| $L_3$ | $r_5 = 91.373$ | $d_5 = 4.98$ | $n_3 = 1.618$ |
|  | $r_6 = 49.662$ | $d_6 = 29.65$ |  |
| $L_4$ | $r_7 = 303.131$ | $d_7 = 4.74$ | $n_4 = 1.50378$ |
| $L_5$ | $r_8 = 13.484$ | $d_8 = 32.41$ | $n_5 = 1.7$ |
|  | $r_9 = -1072.563$ | $d_9$ * |  |
| $L_6$ | $r_{10} = 318.390$ | $d_{10} = 18.40$ | $n_6 = 1.7859$ |
|  | $r_{11} = -186.315$ | $d_{11}$ * |  |
| $L_7$ | $r_{12} = -225.464$ | $d_{12} = 15.41$ | $n_7 = 1.8061$ |
|  | $r_{13} = -73.236$ |  |  |
| $L_8$ | $r_{14} = 144.923$ | $d_{13} = 4.29$ | $n_8 = 1.76182$ |
|  |  | $d_{14} = 8.21$ |  |
| $L_9$ | $r_{15} = -187.757$ | $d_{15} = 10.71$ | $n_9 = 1.6968$ |
|  | $r_{16} = -78.399$ | $d_{16} = 0.43$ |  |
| $L_{10}$ | $r_{17} = 340.194$ | $d_{17} = 12.5$ | $n_{10} = 1.6968$ |
|  | $r_{18} = -210.434$ |  |  |

*$d_9 + d_{11} = 15.04$
*$d_9 = 10.44$ when the object is infinitely distant away from the lens system.

In FIG. 1 is shown the construction of the lens system according to the present example. In the present example, a biconvex positive singlet $L_6$ (radii $r_{10}$, $r_{11}$ and thickness $d_{10}$) immediately following the diaphragm is used as the movable lens according to the invention. When the object is infinitely distant away from the lens systems, this positive singlet $L_6$ is spaced apart from the preceding lens $L_5$ toward the image side by $d_9 = 10.44$ mm. When the object becomes shortly distant away from the lens system, this positive singlet $L_6$ only is moved toward the object side.

In FIGS. 3a, 3b and 3c are shown various aberration characteristic curves of the present embodiment when the object is infinitely distant away from the lens system. FIG. 3a shows the spherical aberration. FIG. 3b the astigmatism and FIG. 3c the distortion.

FIGS. 4a, 4b and 4c show various aberration characteristic curves of the present embodiment when it is used with 1/40× for short distance photographic purposes. FIG. 4a shows the spherical aberration, FIG. 4b the astigmatisms and FIG. 4c the distortion. As seen from FIG. 4b, the astigmatism is considerably increased to intensify the image surface curvature.

FIGS. 5a, 5b and 5c show various aberration characteristic curves similar to FIGS. 4a, 4b and 4c, respectively, but when the movable lens $L_6$ is moved toward the object side.

As seen from FIG. 5b, the astigmatism, the image surface curvature, etc. are corrected to values which are substantially the same as those obtained when the object is infinitely distant away from the lens system. The amount of movement of the movable lens $L_6$ was 1.43 and the focal length $f_m$ thereof was 235.7 which satisfied the condition.

$$0.6 < |f_m/f| < 3.5$$

EXAMPLE 2

$f = 100, 2\omega = 102°$

| Lens | Radii | Thicknesses and Air spaces | n |
|---|---|---|---|
| $L_1$ | $r_1 = 230.462$ | $d_1 = 10.93$ | $n_1 = 1.67$ |
|  | $r_2 = 107.221$ | $d_2 = 30.59$ |  |
| $L_2$ | $r_3 = 223.504$ | $d_3 = 8.74$ | $n_2 = 1.67$ |
|  | $r_4 = 123.499$ | $d_4 = 17.98$ |  |
| $L_3$ | $r_5 = 197.208$ | $d_5 = 8.74$ | $n_3 = 1.67$ |
|  | $r_6 = 138.388$ | $d_6 = 26.55$ |  |
| $L_4$ | $r_7 = 693.696$ | $d_7 = 27.56$ | $n_4 = 1.78472$ |
|  | $r_8 = -2054.833$ | $d_8 = 1.09$ |  |
| $L_5$ | $r_9 = 262.096$ | $d_9 = 20.76$ | $n_5 = 1.834$ |
|  | $r_{10} = -1065.489$ | $d_{10} = 1.09$ |  |
| $L_6$ | $r_{11} = 127.953$ | $d_{11} = 5.46$ | $n_6 = 1.64$ |
|  | $r_{12} = 50.938$ | $d_{12} = 30.35$ |  |
| $L_7$ | $r_{13} = 140.332$ | $d_{13} = 5.46$ | $n_7 = 1.60311$ |
|  | $r_{14} = 50.963$ | $d_{14} = 43.18$ | $n_8 = 1.56883$ |
| $L_8$ | $r_{15} = -83.274$ | $d_{15}$ * |  |
| $L_9$ | $r_{16} = -317.709$ | $d_{16} = 12.35$ | $n_9 = 1.48749$ |
| $L_{10}$ | $r_{17} = -72.372$ | $d_{17} = 5.46$ | $n_{10} = 1.834$ |
|  | $r_{18} = \infty$ | $d_{18}$ * |  |
| $L_{11}$ | $r_{19} = -530.005$ | $d_{19} = 12.84$ | $n_{11} = 1.78472$ |
|  | $r_{20} = 332.547$ | $d_{20} = 5.74$ |  |
| $L_{12}$ | $r_{21} = -220.863$ | $d_{21} = 12.13$ | $n_{12} = 1.618$ |
|  | $r_{22} = -78.791$ |  |  |

-Continued

| Lens | Radii | Thicknesses and Air spaces | n |
|---|---|---|---|
|  |  | $d_{22} = 0.71$ |  |
| $L_{13}$ | $r_{23} = -348.672$ | $d_{23} = 16.12$ | $n_{13} = 1.6968$ |
|  | $r_{24} = -109.270$ |  |  |

*$d_{15} + d_{18} = 21.36$
*$d_{15} = 10.38$ when the object is infinitely distant away from the lens system.

In FIG. 2 is shown the construction of the lens system according to the present example. In the present example, a negative doublet composed of a meniscus lens $L_9$ that is cemented by its rear surface onto a concave lens $L_{10}$ and whose composite focal length $f_m$ is −156.4 is used as the movable lens according to the invention. The diaphragm is located immediately before the movable lens $L_9$, $L_{10}$. When the object is shortly distant away from the lens system, this doublet $L_9$, $L_{10}$ only is moved away from the diaphragm toward the image side.

In FIGS. 6a, 6b and 6c are shown various aberration characteristic curves of the present embodiment when the object is infinitely distant away from the lens system. FIG. 6a shows the spherical aberration, FIG. 6b the astigmatism and FIG. 6c the distortion.

FIG. 7a, 7b and 7c show various aberration characteristic curves of the present embodiment when it is used with 1/40× for short distance photographic purposes. FIG. 7a shows the spherical aberration, FIG. 7b the astigmatism and FIG. 7c the distortion.

As seen from FIG. 7b, the astigmatism is considerably increased to intensify the image surface curvature.

FIGS. 8a, 8b and 8c show various aberration characteristic curves similar to FIGS. 7a, 7b and 7c, respectively, but when the movable lens $L_9$, $L_{10}$ is moved toward the image side by 1.1.

As seen from FIG. 8b, the astigmatism, the image surface curvature, etc., are corrected to values which are substantially the same as those obtained when the object is infinitely distant away from the lens system.

What is claimed is:

1. A wide-angle lens system comprising a front lens group F and a rear lens group R separated by a diaphragm space, said wide-angle lens system effecting focussing by movement of the whole lens system, said rear lens group R including a movable lens arranged near said diaphragm and adapted for correcting the short distance photographic faculty, said movable lens consisting of a lens adapted to be moved along an optical axis when said whole lens system is focussed to the short distance, wherein $f = 100$ and $2\omega = 63°$ and $r_1$ to $r_{18}$, $d_1$ to $d_{17}$ and $n_1$ to $n_{10}$ are defined by the following values, $f = 100, 2\omega = 63°$

| Lens | Radii | Thicknesses and Air spaces | n |
|---|---|---|---|
| $L_1$ | $r_1 = 109.757$ | $d_1 = 21.43$ | $n_1 = 1.67$ |
|  | $r_2 = 369.292$ | $d_2 = 0.54$ |  |
| $L_2$ | $r_3 = 205.119$ | $d_3 = 5.65$ | $n_2 = 1.64$ |
|  | $r_4 = 50.850$ |  |  |

-Continued

| Lens | Radii | Thicknesses and Air spaces | n |
|---|---|---|---|
| | | $d_4 = 13.21$ | |
| $L_3$ | $r_5 = 91.373$ | $d_5 = 4.98$ | $n_3 = 1.618$ |
| | $r_6 = 49.662$ | $d_6 = 29.65$ | |
| $L_4$ | $r_7 = 303.131$ | $d_7 = 4.74$ | $n_4 = 1.50378$ |
| $L_5$ | $r_8 = 13.484$ | $d_8 = 32.41$ | $n_5 = 1.7$ |
| | $r_9 = 1072.563$ | $d_9$ * | |
| $L_6$ | $r_{10} = 318.390$ | $d_{10} = 18.40$ | $n_6 = 1.7859$ |
| | $r_{11} = -186.315$ | $d_{11}$ * | |
| $L_7$ | $r_{12} = -225.464$ | $d_{12} = 15.41$ | $n_7 = 1.8061$ |
| | $r_{13} = -73.236$ | | |
| $L_8$ | $r_{14} = 144.923$ | $d_{13} = 4.29$ | $n_8 = 1.76182$ |
| | | $d_{14} = 8.21$ | |
| $L_9$ | $r_{15} = -187.757$ | $d_{15} = 10.71$ | $n_9 = 1.6968$ |
| | $r_{16} = -78.399$ | | |
| | | $d_{16} = 0.43$ | |
| $L_{10}$ | $r_{17} = 340.194$ | $d_{17} = 12.5$ | $n_{10} = 1.6968$ |
| | $r_{18} = -210.434$ | | |

*$d_9 + d_{11} = 15.04$
*$d_9 = 10.44$ when the object is infinitely distant away from the lens system.

2. A wide-angle lens system comprising a front lens group F and a rear lens group R separated by a diaphragm space, said wide-angle lens system effecting focussing by movement of the whole lens system, said rear lens group R including a movable lens arranged near said diaphragm and adapted for correcting the short distance photographic faculty, said movable lens consisting of a lens adapted to be moved along an optical axis when said whole lens system is focussed to the short distance, wherein $f = 100$ and $2\omega = 102°$ and $r_1$ to $r_{24}$, $d_1$ to $d_{23}$ and $n_1$ to $n_{13}$ are defined by the following values, $f = 100$, $2\omega = 102°$

| Lens | Radii | Thicknesses and Air Spaces | n |
|---|---|---|---|
| $L_1$ | $r_1 = 230.462$ | $d_1 = 10.93$ | $n_1 = 1.67$ |
| | $r_2 = 107.221$ | $d_2 = 30.59$ | |
| $L_2$ | $r_3 = 223.504$ | $d_3 = 8.74$ | $n_2 = 1.67$ |
| | $r_4 = 123.499$ | $d_4 = 17.98$ | |
| $L_3$ | $r_5 = 197.208$ | $d_5 = 8.74$ | $n_3 = 1.67$ |
| | $r_6 = 138.388$ | $d_6 = 26.55$ | |
| $L_4$ | $r_7 = 693.696$ | $d_7 = 27.56$ | $n_4 = 1.78472$ |
| | $r_8 = -2054.833$ | $d_8 = 1.09$ | |
| $L_5$ | $r_9 = 262.096$ | $d_9 = 20.76$ | $n_5 = 1.834$ |
| | $r_{10} = -1065.489$ | $d_{10} = 1.09$ | |
| $L_6$ | $r_{11} = 127.953$ | $d_{11} = 5.46$ | $n_6 = 1.64$ |
| | $r_{12} = 50.938$ | $d_{12} = 30.35$ | |
| $L_7$ | $r_{13} = 140.332$ | $d_{13} = 5.46$ | $n_7 = 1.60311$ |
| $L_8$ | $r_{14} = 50.963$ | $d_{14} = 43.18$ | $n_8 = 1.56883$ |
| | $r_{15} = -83.274$ | | |

-Continued

| Lens | Radii | Thicknesses and Air Spaces | n |
|---|---|---|---|
| | | $d_{15}$ * | |
| $L_9$ | $r_{16} = -317.709$ | $d_{16} = 12.35$ | $n_9 = 1.48749$ |
| $L_{10}$ | $r_{17} = -72.372$ | $d_{17} = 5.46$ | $n_{10} = 1.834$ |
| | $r_{18} = \infty$ | $d_{18}$ * | |
| $L_{11}$ | $r_{19} = -530.005$ | $d_{19} = 12.84$ | $n_{11} = 1.78472$ |
| | $r_{20} = 332.547$ | $d_{20} = 5.74$ | |
| $L_{12}$ | $r_{21} = -220.863$ | $d_{21} = 12.13$ | $n_{12} = 1.618$ |
| | $r_{22} = -78.791$ | $d_{22} = 0.71$ | |
| $L_{13}$ | $r_{23} = -348.672$ | $d_{23} = 16.12$ | $n_{13} = 1.6968$ |
| | $r_{24} = -109.270$ | | |

*$d_{15} + d_{18} = 21.36$
*$d_{15} = 10.38$ when the object is infinitely distant away from the lens system.

3. A wide-angle lens system comprising a front lens group F and a rear lens group R separated by a diaphragm space, said wide-angle lens system effecting focussing by movement of the whole lens system, said rear lens group R including a movable lens arranged near said diaphragm and adapted for correcting the short distance photographic faculty, said movable lens consisting of a lens adapted to be moved along an optical axis when said whole lens system is focussed to the short distance, said movable lens being a positive lens adapted to be moved in response to the change of its distance from an object toward said diaphragm, and the conditions $$0.6 < |f_m/f| < 3.5 \text{ and}$$
$$|f_{FB}| < 1.0|f_F|$$

are satisfied where $f_m$ is the focal length of said movable lens, $f$ is the overall focal length of the total lens system, $f_F$ is the focal length of the front lens group F followed by the movable lens and $f_{FB}$ is the back focal length of the front lens group F folllowed by the movable lens.

4. A wide-angle lens system comprising a front lens group F and a rear lens group R separated by a diaphragm space, said wide-angle lens system effecting focussing by movement of the whole lens system, said rear lens group R including a movable lens arranged near said diaphragm and adapted for correcting the short distance photographic faculty, said movable lens consisting of a lens adapted to be moved along an optical axis when said whole lens system is focussed to the short distance, said movable lens being a negative lens adapted to be moved in response to the change of its distance from an object away from said diaphragm, and the conditions $$0.6 < |f_m/f| < 3.5 \text{ and}$$
$$|f_{FB}| > 1.0|f_F|$$

are satisfied where $f_m$ is the focal length of said movable lens, $f$ is the overall focal length of the total lens system $f_F$ is the focal length of the front lens group F followed by the movable lens and $f_{FB}$ is the back focal length of the front lens group F followed by the movable lens.

* * * * *